May 26, 1925.

W. G. COX 1,539,077

AUTOMOBILE CUSHIONING FENDER

Filed Sept. 20, 1923

Inventor
W.G. COX.

Attorney

May 26, 1925.

W. G. COX 1,539,077

AUTOMOBILE CUSHIONING FENDER

Filed Sept. 20, 1923 2 Sheets-Sheet 2

Inventor
W. G. Cox.

By *Fisher, Merit Fulton*

Attorneys

Patented May 26, 1925.

1,539,077

UNITED STATES PATENT OFFICE.

WILLIAM G. COX, OF CLEVELAND, OHIO, ASSIGNOR TO THE EATON AXLE & SPRING COMPANY, A CORPORATION OF OHIO.

AUTOMOBILE CUSHIONING FENDER.

Application filed September 20, 1923. Serial No. 663,804.

*To all whom it may concern:*

Be it known that I, WILLIAM G. COX, a citizen of the United States, residing at Cleveland, in the county of Cuyahoga and State of Ohio, have invented certain new and useful Improvements in an Automobile Cushioning Fender, of which the following is a specification.

This invention relates to an improvement in a cushioning fender for automobiles, and my object is to provide a triple bar fender in which one bar is made of spring material and formed with S-shaped bends to promote spring cushioning effects under shock and also to permit the fender to be readily attached to and supported upon an automobile frame, and the formation of this bar and its placement in respect to the other bars is also such that its main body or middle portion is extended flush with and parallel to the remaining bars to become a component part of the impact area of the fender.

In the accompanying drawings, Fig. 1 is a perspective view of my improved cushioning fender mounted upon the front of an automobile.

Fig. 6 is a perspective view of one of the vertical tie plates or pieces.

Figure 1:
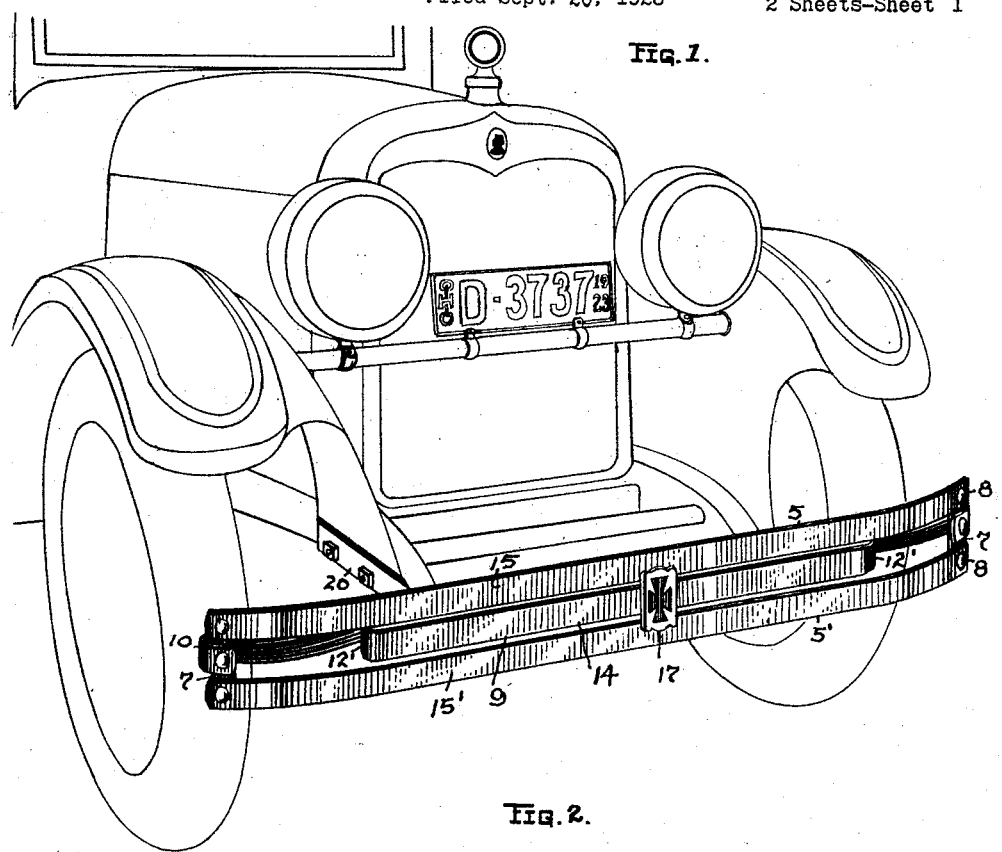
Figure 2:
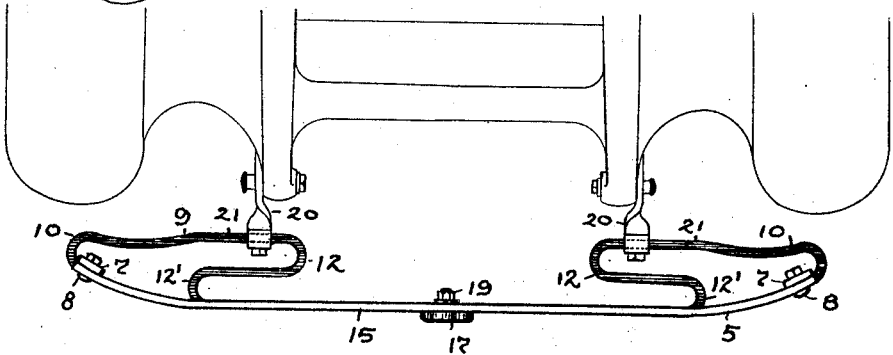
Fig. 2 is a top view of the fender attached to an automobile.
Figure 3:
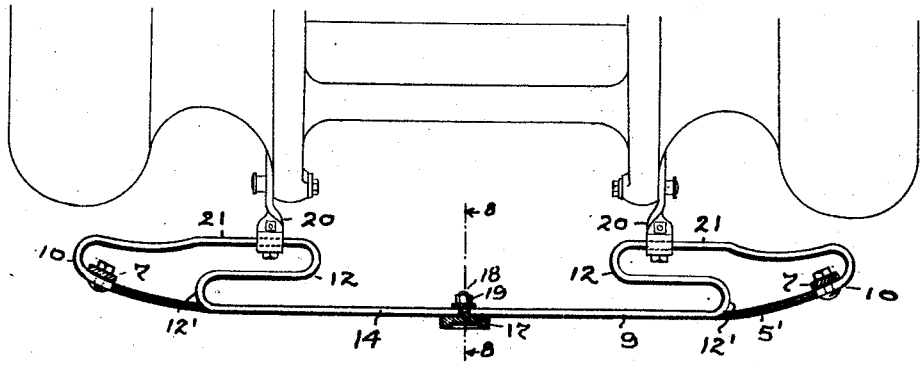
Fig. 3 is a horizontal section and top view of the fender on line 3—3 of Fig. 7.
Figure 4:
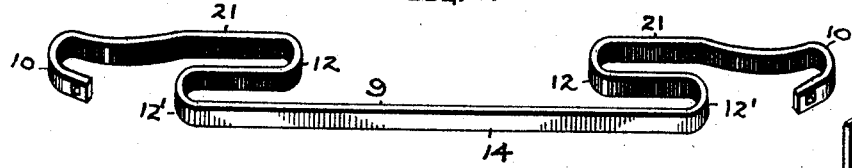
Fig. 4 is a perspective view of the metallic supporting bar alone.
Figure 5:
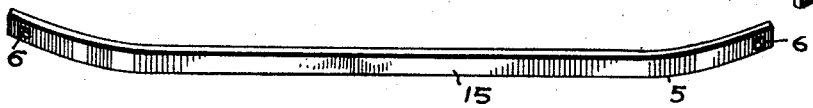
Fig. 5 is a perspective view of one of the two corresponding impact rails.
Figure 7:
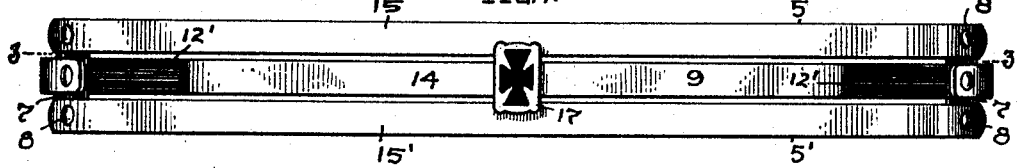
Fig. 7 is a front view of the fender complete.
Figure 8:
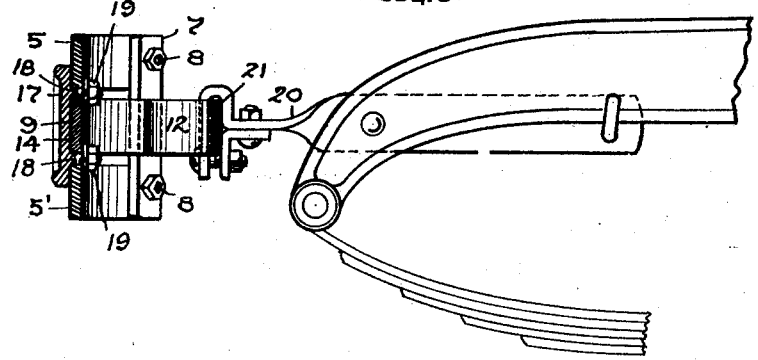
Fig. 8 is an enlarged vertical cross section of the fender on line 8—8 of Fig. 3, illustrating one way of mounting it upon an automobile frame.

The fender consists of a pair of corresponding impact rails 5—5' respectively, having rearwardly curved end portions containing round or square bolt openings 6. These two rails extend parallelly edge to edge and are spaced apart a substantial distance and secured together at their corresponding ends by flat vertical strips 7 and bolts and nuts 8. A metallic supporting bar 9 is secured at its opposite terminal portions 10 to the flat vertical strips 7 midway between the points of attachment for upper and lower rails 5 and 5', and flat bar 9 is bent into S-shape relatively near each end or terminal portion 10 to provide resilient spring portions 12—12 adapted to cushion any blow or shock imparted to the fender. The middle portion 14 of bar 9 between the resilient S portions 12—12 is straight or substantially straight and lies in the same vertical plane and flush with the middle portions 15—15' of the two impact rails 5—5', thereby forming a relatively large flat impact area throughout the middle part of the fender which is practically closed except for the narrow gaps or slots between supporting bar 9 and the upper and lower rails, and excepting the larger openings intermediate the S bends 12—12 and the terminal portions 10 of bar 9. However, these larger openings may be practically closed by either extending the terminal portions towards the S bends or by forming the first bend 12' nearer terminal 10. As shown the terminal portions 10 are bent forwardly and thence toward the bends 12' which provides rounded terminals for bar 9 and permits the vertical connecting strips 7 and the nuts for bolts 8 to be placed upon the inside of these rounded terminals. The middle impact portions of bar 9 and rails 5—5' may be tied together at one or more places, for example at the center as exemplified in Figs. 3 and 8, wherein I show a tie plate 17 having screw-threaded studs or bolts 18 passing between the gaps or slots above and below bar 9 and secured by nuts 19 at the rear of said bar.

Any suitable mode of attaching this fender upon an automobile may be adopted and used, but as automobiles vary in width the bracket or attachment member is preferably made a separate part of the fender and the connections are of a kind to permit lateral adjustments to be made. And to facilitate making such attachments in the present fender the S-shaped spring portions 12—12 are made with relatively long terminal portions whereby the bracket or equivalent supporting member 20 may be adjustably connected at various points to the straight part 21 of said terminal portions.

What I regard as my invention or discovery, and desire to claim, is:

1. A cushioning fender for an automobile comprising a supporting bar having a middle impact portion and S-shaped spring portions at opposite ends of said impact portion, and impact rails connected to said bar parallelly above and below said impact portion and having their ends connected with the ends of said bar.

2. A cushioning fender for an automobile, comprising a supporting bar having a middle impact portion and S-shaped spring terminals, and a pair of striking rails extending parallelly with said impact portions and having their ends connected to said terminals.

3. A cushioning fender for an automobile, comprising a supporting bar having a middle impact portion and supporting terminal portions and bent intermediate each terminal portion and the ends of said impact portion to provide cushioning spring portions, and a pair of striking rails extending horizontally parallel and vertically flush with said middle impact portion substantially throughout the major length of said fender and connected at their respective ends with the corresponding ends of said supporting bar.

4. A cushioning fender for an automobile, comprising three horizontal striking members of spring metal connected together at their corresponding ends and disposed flush with each other in a vertical plane and forming a relatively high and broad impact face, one of said members having S-shaped spring bends therein and extended rearwardly of said plane to facilitate attachment with the automobile.

5. A cushioning fender for an automobile, a pair of parallel upper and lower flat spring striking rails, and a central bar of flat spring metal having a substantially straight middle impact portion aligned with said rails and formed with double spring bends and supporting portions terminating in rounded extremities, and means connecting said extremities and the corresponding ends of said rails together.

In testimony whereof I affix my signature hereto this 17th day of September, 1923.

WILLIAM G. COX.